US006223415B1

(12) United States Patent
Shin et al.

(10) Patent No.: US 6,223,415 B1
(45) Date of Patent: May 1, 2001

(54) PROCESS FOR MANUFACTURING AL-SI ALLOYS FOR USE IN VEHICLE PROPELLER SHAFTS

(75) Inventors: Don Soo Shin; Byong Jo Kim; Bong Gil Kim; Hyun Kwang Seok; Jae Chul Lee; Ho In Lee, all of Seoul (KR)

(73) Assignees: Korea Institute of Science & Technology; Dooray Air Metal Co., Ltd., both of Seoul (KR)

( * ) Notice: Subject to any disclaimer, the term of this patent is extended or adjusted under 35 U.S.C. 154(b) by 0 days.

(21) Appl. No.: 09/532,785

(22) Filed: Mar. 22, 2000

(30) Foreign Application Priority Data

Jan. 31, 2000 (KR) .............................................. 2000-4730

(51) Int. Cl.$^7$ ...................................................... C22F 1/04
(52) U.S. Cl. ............................. 29/527.5; 164/46; 148/550
(58) Field of Search ........................... 29/527.5; 148/550; 164/46

(56) References Cited

U.S. PATENT DOCUMENTS

| | | | | |
|---|---|---|---|---|
| Re. 31,767 | * | 12/1984 | Brooks | ................................... 164/46 |
| 5,902,546 | * | 5/1999 | Kawasetsu et al. . | |
| 6,068,043 | * | 5/2000 | Clark | ..................................... 164/46 |

* cited by examiner

*Primary Examiner*—P. W. Echols
(74) *Attorney, Agent, or Firm*—Rosenburg, Klein & Lee

(57) ABSTRACT

A process for manufacturing an Al—Si alloy for use in a vehicle propeller shaft is provided. The Al—Si alloy manufacturing process includes the steps of heating and melting Al—Si alloy where Si contains 13–40 weight percentage (wt %) of the whole alloy, to thereby prepare melt, maintaining the melt at 700–900° C. and then spraying an high pressure inert gas to the melt and rapidly solidifying the same to thereby obtain a forming body, and extruding the forming body at 400–550° C. The physical properties of the Al—Si alloy manufactured by a spray forming process is at least similar to that of the vehicle propeller shafts which have been already known, and also spotlighted as new alloy compositions which can replace the conventional propeller shaft material.

3 Claims, 1 Drawing Sheet

PROCESS FOR MANUFACTURING AL-SI ALLOYS FOR USE IN VEHICLE PROPELLER SHAFTS

BACKGROUND OF THE INVENTION

1. Field of the Invention

The present invention relates to a process for manufacturing Al—Si alloys which can be used as a vehicle propeller shaft, and more particularly, to an Al—Si alloy manufacturing process which can be used as the material for use in a vehicle propeller shaft, having an excellent mechanical strength and Young's modulus and an enhanced working performance, in which a great amount of silicon (Si) added by a spray forming process is finely distributed within an aluminum (Al) matrix structure.

2. Description of Prior Art

A propeller shaft for a vehicle is a mechanical component which is installed between a transmission and a driving shaft in a vehicle, for transmitting power and has been manufactured in various forms according to purpose in use.

If a rotational speed of a propeller shaft reaches a certain value during running a vehicle, noise and fracture of the propeller shaft occurs, which is caused by a resonance between an actual oscillation of the propeller shaft and an inherent oscillation thereof. That is, since the propeller shaft is rotated by a rotational torque of an engine, a twisted oscillation occurs, and also when the center of the shaft is not coincided with the rotational shaft, a bending oscillation occurs due to the shaft being bent by a centrifugal force. When these oscillations occurring by the rotation of the propeller shaft are resonant with an inherent oscillation of the propeller shaft, the shaft is accompanied by noise and fracture phenomenon, in which case the rotational speed of the propeller shaft is called a critical rotational speed (Nc), which is expressed as the following equations (1) and (2).

$$N_c(\text{rpm}) = \frac{60\pi}{2l^2} \sqrt{\frac{EIg}{A\tau}} \quad (1)$$

$$I = \frac{\pi}{64}(d_o^4 - d_i^4), \quad A = \frac{\pi}{4}(d_o^2 - d_i^2) \quad (2)$$

Here, E denotes Young's, modulus of a material (kg/mm$^2$), $\tau$ denotes a specific weight (kg/mm$^3$), l denotes the length of a shaft (mm), I denotes a secondary sectional moment (mm$^4$), g denotes the acceleration of gravity, A denotes a sectional area of a sample, $d_o$ denotes an outer diameter of the shaft, and $d_i$ denotes an inner diameter of the shaft.

In the above equations (1) and (2), the critical rotational speed Nc can be expressed as a function of the length l of the propeller shaft, the specific Young's modulus E/$\tau$, the inner and outer diameters of the shaft.

Thus, since the inner and outer diameter of a shaft is chiefly determined by the mechanical strength of a material used in the shaft, it can be seen that a propeller shaft for an automobile requires a high specific modulus and mechanical strength. If a material having a high mechanical strength is used in a propeller shaft, the diameter and thickness of the propeller shaft are reduced, resulting in the lightness of the automobile and ease of the design thereof.

As can be seen from Table 1 representing the kinds and physical properties of the materials which are used as a conventional propeller shaft, the specific modulus of S45C steel is 2.73×10$^9$ mm, the specific modulus of 6061 aluminum alloy is 2.65×10$^9$ mm, and the specific modulus of aluminum matrix composite material such as Duralcan is 3.38×10$^9$ mm. The specification (diameter $\phi$×thickness t) of the propeller shaft manufactured as S45C steel, 6061 aluminum alloy, and aluminum matrix composite material which are currently mass-produced is $\phi$80 mm×t2 mm, $\phi$120 mm×t2 mm, and $\phi$90 mm×t2 mm, respectively, and the length is 1264 mm. When the length of the propeller shaft is 1264 mm, change in a critical rotational speed value according to the diameter, thickness and the specific Young's modulus of the propeller shaft calculated using the equations (1) and (2) represents a value of 8500–12500 rpm approximately.

In view of metallurgical engineering, in the case that particles having a high Young's modulus such as silicon, alumina or carbon silicate is added in aluminum matrix structure, Young's modulus of the material becomes high. In addition, as the size of the particles distributed in the matrix structure is fine, the mechanical strength increases.

However, Al—Si alloy system has a limitation in using it as a propeller shaft material for automobiles, as can be seen from the phase diagram, because the initially-crystallized Si particles are dispersed coarsely during solidification thereby causing a workability of the material to be worse, in the case that a great amount of Si is added in Al matrix structure, that is, hypereutectic Al—Si alloy is manufactured using a conventional casting process. Thus, the present inventors have studied a method for dispersing a great number of Si particles finely in the Al matrix structure. As a result, the inventors have discovered that a metal structure where a great amount of Si is finely dispersed in the Al matrix can be obtained by rapidly solidifying molten metal at a cooling rate of 10$^3$–10$^5$ K/sec by a spray forming process in which droplets sprayed by a high pressure inert gas such as nitrogen flying at the state where they are not perfectly solidified, reach a substrate and are solidified completely, to thereby form a forming body, and accordingly have completed the present invention.

SUMMARY OF THE INVENTION

To solve the prior art problems, it is an object of the present invention to provide a process for manufacturing Al—Si alloys which can be used as a vehicle propeller shaft, having an excellent mechanical strength and Young's modulus and an enhanced working feature, in which a great amount of silicon (Si) added by a spray forming process is finely dispersed within an aluminum (Al) matrix structure, in a hypereutectic composition.

To accomplish the above object of the present invention, according to a first aspect of the present invention, there is provided a process for manufacturing an Al—Si alloy for use in a vehicle propeller shaft, the Al—Si alloy manufacturing process comprising the steps of: heating and melting Al—Si alloy where Si contains 13–40 weight percentage (wt %) of the whole alloy, to thereby prepare melt; maintaining the melt at 700–900° C. and then spraying the melt by high pressure inert gas and rapidly solidifying the same to thereby obtain a forming body; and extruding the forming body at 400–550° C.

The content of Si added in Al is 13–40 wt %, preferably 22–28 wt %. In this case, if the content of Si is less than 13 wt %, it is difficult to expect a sufficient increase in Young's modulus. If the content of Si exceeds 40 wt %, Si particles becomes coarse rapidly, which is undesirable.

Also, a spray of the Al alloy melt is performed at 700–900° C. according to an amount of addition of Si, in which it takes several minutes until the whole melt reaches uniform temperature and thus the spray is performed after several minutes.

When a spray forming body is extruded, an appropriate extrusion temperature is 400–550° C., according to a content of Si. If an extrusion temperature is less than 400° C., it is difficult to perform an extruding work since the temperature is too low. If an extruding temperature exceeds 550° C., thermal fracture occurs during extrusion process and thus it is difficult to obtain excellent extruded material.

Meanwhile, in addition to Si in the present invention, Mg, Cu and so on can be added as an alloying element. When these elements are added, the elements which have been employed excessively according to rapid solidification are distributed in the Al matrix structure in the form of fine precipitates. As a result, the mechanical strength of the alloy obtained by precipitation hardening can be increased. An amount of addition of these alloying elements is preferably not more than about 5% of the whole alloy composition weight. In the case that the addition amount exceeds 5 wt %, the precipitates become coarse, which limits an increase in mechanical strength.

DETAILED DESCRIPTION OF THE EMBODIMENT

A preferred embodiment of the present invention will be described in more detail with reference to the accompanying drawings.

Figure 1:
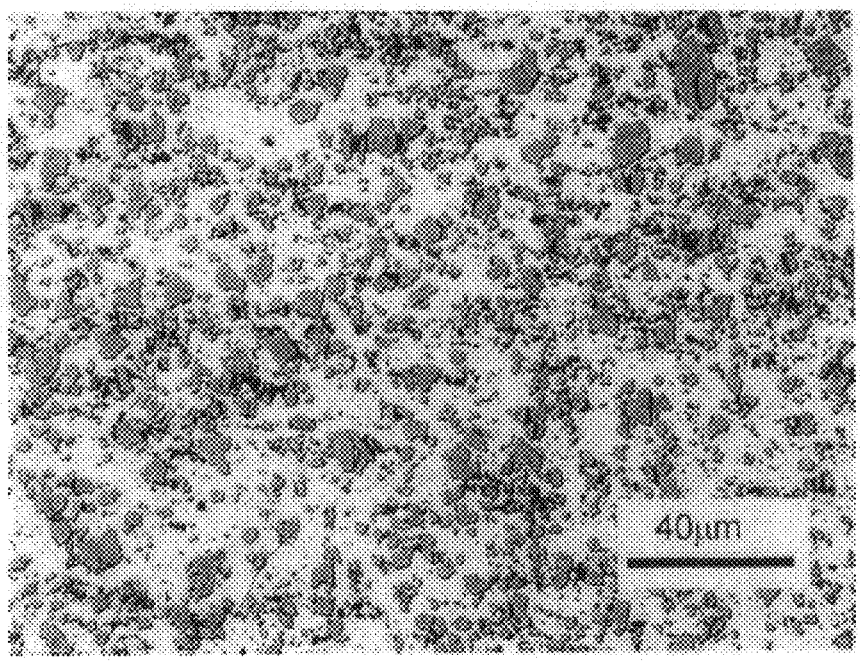
FIG. 1 is a pictorial view showing an optical microstructure of an Al-25 wt %Si alloy according to the present invention.
Figure 2:
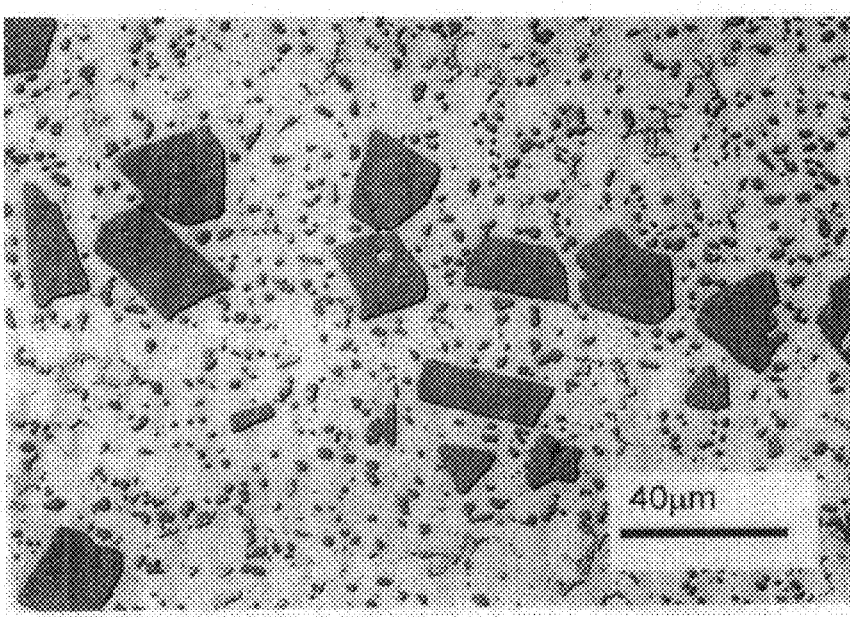
FIG. 2 is a pictorial view showing an optical microstructure of an Al-17 wt %Si alloy according to a conventional casting process.

Si is added to Al at a ratio of 13 wt %, 25 wt % and 40 wt %, respectively. Then, the mixed Al—Si is loaded into an induction furnace and heated and maintained at a sufficiently higher temperature than a liquidus line of an Al—Si alloy. As a result, an Al—Si alloy melt of a uniform composition is manufactured. Then, the melt in a turndish is maintained at 700–900° C. for about two minutes according to a content of Si, and then a spray forming process is performed while varying a spraying distance between 250 mm and 450 mm in which an initial spraying speed is 200 m/sec, a substrate falling speed is 0.8 mm/sec and a spraying angle is 30°. As a result, a forming body is obtained in the form of a rod whose diameter is 250–300 mm and height is 500–1200 mm. As shown in FIGS. 1 and 2, the forming body of the thus-manufactured Al—Si alloy is compared with an Al—Si alloy manufactured according to a conventional casting process, using a respective picture showing an optical microstructure.

Meanwhile, the forming body obtained by the above-described process is worked so that it has an outer diameter of 230 mm and a height of 500 mm. Thereafter, the forming body is extruded under condition that extrusion temperature is 400–550° C., in an extruder of 2200 tons, using an extrusion die and a mandrel, in which the extrusion die has an outer diameter of 97 mm and an inner diameter of 77 mm and the mandrel has the former of 130 mm and the latter of 124 mm. Then, the physical properties of the thus-obtained extruded material have been measured. The measured results are shown in Table 1. together with the physical properties of the materials which are widely commercialized as a conventional vehicle propeller shaft.

TABLE 1

|  |  | Elongation (%) | Young modulus (GPa) | Tensile strength (MPa) | Specific young modulus (x10$^9$ mm) |
|---|---|---|---|---|---|
| conventional | S45C | 20 | 210 | 850 | 2.73 |
|  | 6061 aluminum alloy | 12 | 70 | 310 | 2.65 |
|  | Duralcan composite material (20% Al$_2$O$_3$/6061 Al) | 2 | 100 | 390 | 3.38 |
| present invention | Al-13wt % Si | 5 | 75 | 320 | 2.8 |
|  | Al-25wt % Si | 10 | 88 | 420 | 3.4 |
|  | Al-40wt % Si | 0.5 | 105 | 300 | 4.0 |

FIG. 1 is a pictorial view showing an optical microstructure of an Al-25 weight percentage (wt %) Si alloy which is manufactured according to the present invention, and FIG. 2 is a pictorial view showing an optical microscopic minute structure of an Al-17 wt % Si alloy which is manufactured according to a conventional casting process.

As shown in FIG. 1, in the case of the microstructure of the Al—Si alloy manufactured by a spray forming process according to the present invention, fine Si particles having an average diameter of about 5–8 μm are uniformly distributed in the Al matrix although the content of Si is 25 wt % which remarkably exceeds that of Si in the eutectic composition. However, as shown in FIG. 2, since Al—Si alloy manufactured by a conventional casting process is solidified slowly, it can be seen that the initial Si particles are very coarse although the Si content is only 17 wt %.

Thus, as shown in Table 1, the tensile strength of the Al-25 wt % Si alloy having hypereutectic composition manufactured by the spray forming process according to the present invention is 420 MPa which is higher than a conventional aluminum composite material. Also, a specific Young's modulus (E/τ) value is about 3.4×10$^9$ mm, which is very high value. If the content of Si varies into 13% and 40%, the value of the tensile strength is reduced to 320 MPa and 300 Mpa, respectively. These results are, however, still comparable with conventional materials. Thus, in the case of the Al-25 wt % Si alloy manufactured according to the present invention, a propeller shaft having a diameter of about 90 mm and a thickness of about 2 mm can be manufactured and the critical rotational speed (Nc) measured under the given condition is about 10800 rpm, which is a higher than that of the propeller shaft manufactured using the conventional metal based composite material. Also, in the case that the alloys having the compositions of the Al-13 wt % Si and the Al-40 wt % Si are manufactured in a propeller shaft having a diameter of about 120 mm and a thickness of about 2 mm, the critical rotational speed is 12800 rpm and 15400 rpm, respectively, which are higher than that of the propeller shaft manufactured using the conventional 6061 alloy.

As described above, the physical properties of the Al—Si alloy manufactured by a spray forming process according to the present invention is at least similar to that of the conventional vehicle propeller shaft and, therefore spotlighted as a new alloy system which can be used to replace the conventional propeller shaft material.

What is claimed is:

1. A process for manufacturing Al—Si alloy for use in a vehicle propeller shaft, comprising the steps of:

heating and melting Al—Si alloy where Si contains 13–40 weight percentage (wt %) of the whole alloy, to thereby prepare melt;

maintaining the melt at 700–900° C. and then spraying an high pressure inert gas to the melt and rapidly solidifying the same to thereby obtain a forming body; and extruding the forming body at 400–550° C. to thereby obtain an extruded material.

2. The Al—Si alloy manufacturing process of claim 1, wherein the content of Si is 22–28 wt %.

3. The Al—Si alloy manufacturing process of claim 1, wherein Mg and/or Cu are added as alloying elements, which are not more than 5 wt % of the whole alloy.

* * * * *